Aug. 14, 1962

G. DAUMY ET AL 3,049,335

BUTTERFLY GATES

Filed Aug. 15, 1958

INVENTORS
GEORGES DAUMY
GEORGES RAMBAUD
MARCEL ARNOUX
BY Irwin S. Thompson
ATTY.

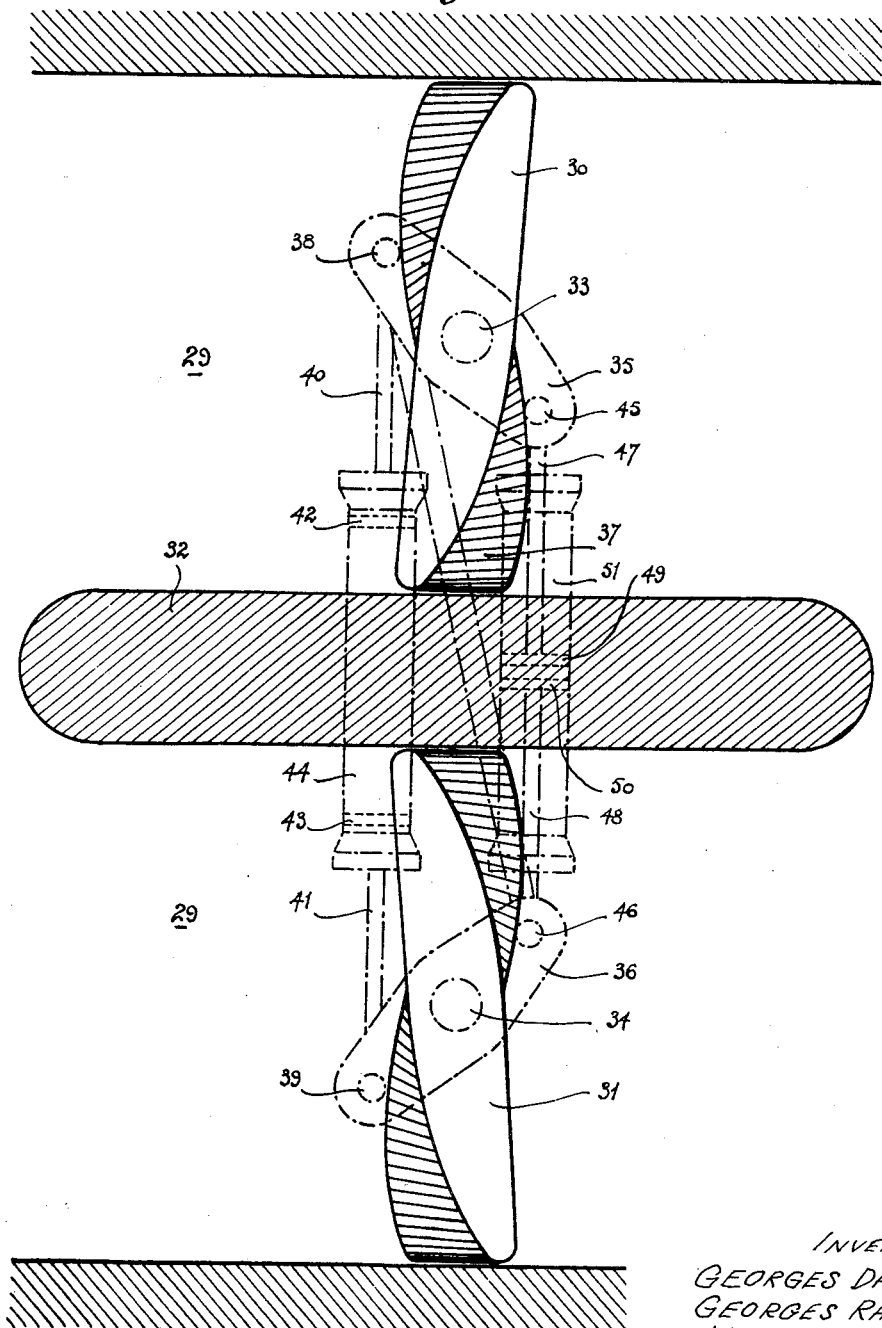

United States Patent Office 3,049,335
Patented Aug. 14, 1962

3,049,335
BUTTERFLY GATES
Georges Daumy, Seyssins, Georges Rambaud, Brie et Angonnes, and Marcel Arnoux, Grenoble, France, assignors to Etablissements Bouchayer & Viallet, Grenoble, France, a corporation of France
Filed Aug. 15, 1958, Ser. No. 755,271
Claims priority, application France Aug. 21, 1957
5 Claims. (Cl. 251—305)

The present invention relates to butterfly-gates used in hydraulic systems, and in a general way for the flow of all fluids, in order to regulate the rate of flow in a conduit.

The hydrodynamic stresses which are applied to a butterfly-gate during the operations of opening and closing are often considerable, and the installation necessitates a large and expensive actuating apparatus.

In order to reduce the size of the operating gear of a butterfly-gate, efforts have been made to reduce the value of the hydraulic couple acting on the shuttle-plate of the gate during the operation of the latter, and this has been effected by various expedients, such as making its pivotal axis eccentric, use of counterweights, addition to the shuttle-plate of fixed noses or movable shutters.

The present invention has for its object a butterfly-gate in which the same problem is solved in a more simple manner.

This gate is characterised in that its shuttle-plate has a twisted form such that the diametral axis of its transverse section at right angles to the pivotal axis has an orientation which varies from one extremity of the said shuttle-plate to the other.

This variable orientation may take the form of a more or less pronounced angular distance between the end sections of the gate. A value of this distance which has been proved satisfactory is 20°.

It is well known that the hydraulic couple which is applied to a butterfly-gate during its opening varies considerably according to the angle made by the gate with the axis of the conduit in which it is placed. This couple is zero at the fully-open or fully-closed positions. It rises to a maximum value for a certain position of opening fairly near to the fully-open position.

With a straight shuttle-plate, this maximum has a high value. With the gate according to the invention, this maximum still exists but it is reduced in magnitude. It may be said that the gate, the shuttle-plate of which has a large surface, behaves like a series of elementary gates acting at different openings, which results over the whole of the gate in the production of a couple having a value which is necessarily less than the maximum value obtained with butterfly-gates having straight shuttle-plates.

The accompanying drawings show various forms of embodiment of the butterfly-gate in accordance with the invention.

FIG. 7 is a view in horizontal cross-section of an arrange of two twin butterfly-gates with their operating gear.

Figure 1:
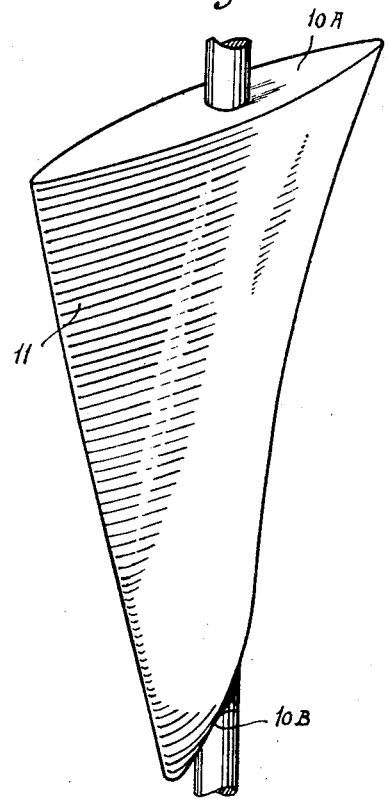
FIG. 1 is a view in perspective of the butterfly-gate with a symmetric transverse profile.

As shown in FIG. 1, the gate according to the invention has a straight symmetric section 10. From the top to the bottom of the gate, this section 10 is progressively displaced angularly so that the shuttle-plate 11 has the form of a non-cylindrical warped surface connecting together the contours of the two end sections 10A and 10B.

Figure 2:
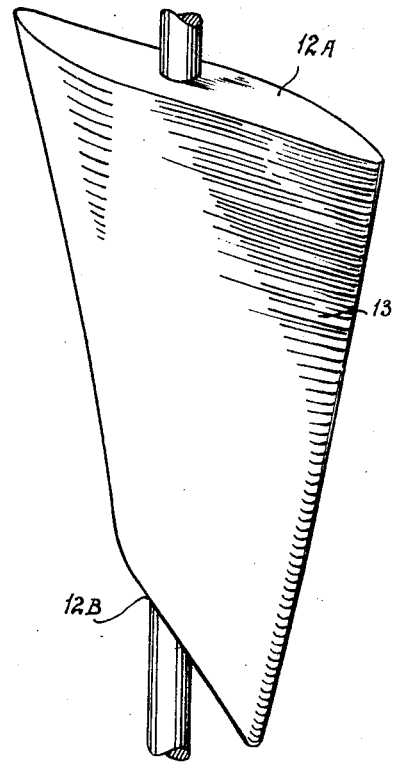
FIG. 2 is a view in perspective of the buterfly-gate with an asymmetric transverse profile.

In the case of FIG. 2, the section 12 of the gate is asymmetric and this section, which is progressively displaced from top to bottom from 12A to 12B, so that the shuttle-plate 13 has a warped non-cylindrical surface connecting together the two end sections 12A and 12B, displaced by an angle α. This angle may have any desired value, depending on the dimensions of the gate. An angle of 20° is generally sufficient.

If the surface is geometrically defined like that described for the section 10 or 12, with an angular displacement proportional to its movement along the axis 14, which is the pivotal axis of the gate, the surface of the shuttle-plate 13 is a helicoidal surface.

The geometric generator line of this surface can however be defined differently. The latter can in fact be defined as the surface generated by the straight lines 15 (see FIG. 4), connecting the corresponding points 16 and 17 of the end sections 12A and 12B. By corresponding points 16 and 17, are meant the points of the contour of the sections 12 corresponding to the same distance, measured over the said contour from the extremities 16 and 19 of the diametral axis of the section. In this way, a regulated surface 20 is obtained. It has been found by tests that the hydraulic results obtained with a shuttle-plate 20 thus formed are practically identical with those which are obtained with the helicoidal shuttle-plate 13 shown in FIG. 3. The construction with a regulated surface is easier. Other warped shapes could also be employed for the shuttle-plate.

Figure 5:
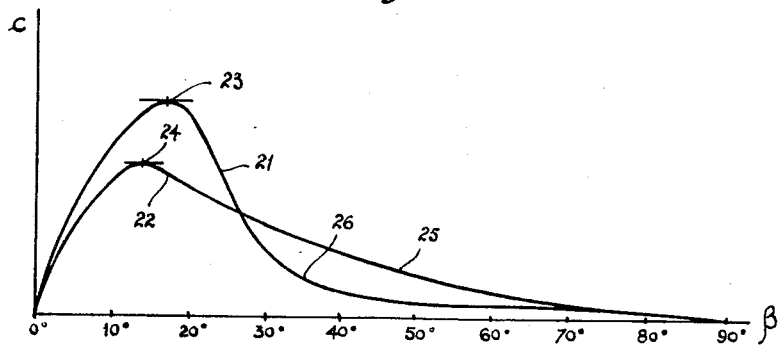
FIG. 5 is a curve showing the comparative variations of the hydraulic stresses as a function of the angle of opening of a gate in accordance with FIG. 1 and a gate of the same section but of straight form.
Figure 6:
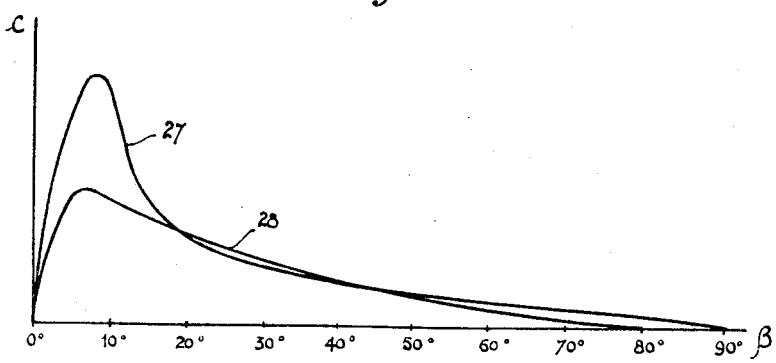
FIG. 6 is a similar comparative curve for the gates of FIG. 2.

When a butterfly-gate with a warped surface according to the invention is compared with a butterfly-gate of the same section with a straight shuttle-plate, the results illustrated by the curves of FIGS. 5 and 6 are observed.

In these curves, the abscissae represent the angles of opening β of the gate from the maximum opening (O) up to the complete closure (90°). As ordinates, there are plotted the hydraulic couples applied to the gate.

In FIG. 5 is given the comparison of the twisted and straight gates for symmetrical sections, such as that of FIG. 1. Curve 21 shows the variation of the couple with opening in the case of the straight gate; curve 22 shows the same variation for the warped gate according to the invention.

It can be seen that the curve 22 has a maximum 24 which is clearly less than the maximum 23 of the curve 21. In addition, this curve 22 has a falling portion 25 which is definitely less abrupt than that 26 of the curve 21. The variation in the case of the gate with a warped shuttle-plate is thus much more progressive than with the gate with a straight shuttle-plate, with a maximum couple 24 much less accentuated.

Figure 3:
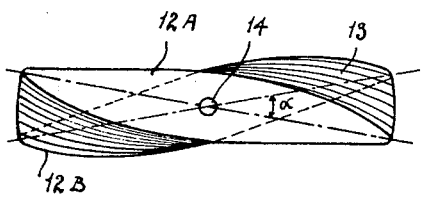
FIG. 3 is a plan view corresponding to FIG. 2.
Figure 4:
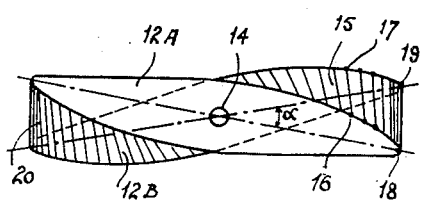
FIG. 4 is a plan view of a further form of construction.

FIG. 6 shows in the same way the variation of the couple C according to the angle of opening β for an asymmetrical gate of the type shown in FIGS. 2 to 4. The curve 27 relates to a gate with a cylindrical shuttle-plate; curve 28 shows the results obtained with a gate having a warped shuttle-plate in accordance with the invention. A comparison of the two curves 27 and 28 clearly shows the reduction in the maximum couple and the greater progressivity of the variation for the gate according to the invention with a warped shuttle-plate.

The use of butterfly-gates with warped shuttle-plates according to the invention thus enables their individual operation to be effected more easily. This advantage is further accentuated when a conjoint operation is used of two twin butterfly-gates, as shown in FIG. 7

In this figure there is shown in the same head-bay 29 two gates 30 and 31 of the type shown in FIG. 4, arranged symmetrically on each side of a central pier 32. These gates pivot respectively about the vertical shafts 33 and 34. Each of these shafts carries a double crank 35 and 36. These cranks are arranged symmetrically with respect to the pier 32 and are coupled together by a coupling rod 37. On one side, the cranks 35 and 36 are coupled at 38 and 39 to the rods 40 and 41 of the two oppositely-acting pistons 42 and 43 of a single hydraulic jack 44 which has no bottom member.

In the same way, on the opposite side, the cranks 35 and 36 are coupled at 45 and 46 to the rods 47 and 48 of the pistons 49 and 50 of a hydraulic jack 51.

It can be seen that by actuating the jacks 44 and 51, the conjoint and simultaneous opening or closure of the two gates 30 and 31 can be effected.

During the course of their conjoint movement, the two gates act as supports for each other, which balances the effects of the operation and relieves the fixing points or anchorages of the mechanisms on the fixed portions of the gating installation.

What we claim is:

1. A butterfly gate valve comprising a fluid conduit having a shuttle plate mounted on a shaft inside said fluid conduit at right angles to the direction of flow of the fluid, said shuttle plate consisting of symmetrical surfaces having a progressive twist corresponding to a torsion of the two extremities with respect to each other.

2. A butterfly gate valve comprising a fluid conduit having a shuttle plate mounted on a shaft inside said fluid conduit at right angles to the direction of flow of the fluid, said shuttle plate consisting of symmetrical surfaces having a progressive twist corresponding to a torsion of approximately 20° with respect to each other.

3. A butterfly gate valve comprising a fluid conduit having a shuttle plate mounted on a pivotal axis inside said fluid conduit at right angles to the direction of flow of fluid therein, said shuttle plate consisting of two end sections and surfaces of twisted configuration formed between said two end sections, said surfaces composed of transverse sections perpendicular to said pivotal axis wherein each transverse perpendicular section has a different orientation from one end of the shuttle plate to the other thereby being helicoidal.

4. A butterfly gate according to claim 3, wherein the orientation of each transverse section differs from 0° to 20° from one end of the shuttle plate to the other.

5. A gating system for regulating passage of a fluid in a hydraulic conduit comprising a butterfly gate consisting of a shuttle plate mounted on a pivotal axis placed at a right angle to the direction of flow of fluid, said shuttle plate having two end sections and surfaces of helicoidal configuration formed between said two end sections, said surfaces composed of transverse sections perpendicular to said pivotal axis wherein each transverse perpendicular section has a different orientation from one end of the shuttle plate to the other, a double crank carried by said pivotal axis, and means connected to said crank to operate the gate thereby requiring low torque to operate the gate due to the helicoidal configuration of the shuttle plate.

References Cited in the file of this patent

UNITED STATES PATENTS

| | | |
|---|---|---|
| 345,761 | Bennett | July 20, 1886 |
| 508,584 | Stevens | Nov. 14, 1893 |
| 634,368 | Pounds | Oct. 3, 1899 |
| 1,129,864 | Haas | Mar. 2, 1915 |
| 2,010,694 | Jones | Aug. 6, 1935 |
| 2,048,657 | Jaeger | July 21, 1936 |
| 2,228,733 | Reichhelm | Jan. 14, 1941 |
| 2,271,390 | Dodson | Jan. 27, 1942 |
| 2,624,541 | Ziebolz | Jan. 6, 1953 |
| 2,626,789 | Mock | Jan. 27, 1953 |
| 2,643,677 | McLean | June 30, 1953 |
| 2,662,545 | Kelley | Dec. 15, 1953 |